(12) United States Patent
Shin et al.

(10) Patent No.: US 12,533,487 B2
(45) Date of Patent: Jan. 27, 2026

(54) MEDICAL DEVICE FOR PUNCTURING

(71) Applicant: STARMED CO., LTD., Goyang-si (KR)

(72) Inventors: Kyung Hoon Shin, Gimpo-si (KR); Dong Un Kim, Gimpo-si (KR); Yo Han Lee, Gimpo-si (KR)

(73) Assignee: STARMED CO., LTD., Goyang-si (KR)

( * ) Notice: Subject to any disclaimer, the term of this patent is extended or adjusted under 35 U.S.C. 154(b) by 509 days.

(21) Appl. No.: 18/070,698

(22) Filed: Nov. 29, 2022

(65) Prior Publication Data

US 2023/0173227 A1 Jun. 8, 2023

(30) Foreign Application Priority Data

Dec. 2, 2021 (KR) .......... 10-2021-0170876

(51) Int. Cl.
*A61M 25/00* (2006.01)
*A61B 18/14* (2006.01)
*A61M 25/01* (2006.01)

(52) U.S. Cl.
CPC .... *A61M 25/0082* (2013.01); *A61M 25/0138* (2013.01); *A61M 25/0147* (2013.01)

(58) Field of Classification Search
CPC .......... A61B 18/12; A61B 2018/00053; A61B 2018/00154; A61B 2018/00202; A61B 17/34; A61B 18/1492; A61B 2090/3966; A61B 2017/00247; A61B 2017/00867; A61B 2018/00595; A61B 2218/002; A61M 25/0082; A61M 25/0138; A61M 25/0147; A61M 25/007; A61M 5/007
See application file for complete search history.

(56) References Cited

U.S. PATENT DOCUMENTS

| | | | |
|---|---|---|---|
| 5,843,152 A * | 12/1998 | Tu | A61N 1/06 606/41 |
| 6,217,576 B1 * | 4/2001 | Tu | A61B 18/1492 606/41 |
| 9,743,984 B1 * | 8/2017 | Curley | A61B 18/1477 |
| 2003/0004506 A1 | 1/2003 | Messing | |
| 2003/0130711 A1 * | 7/2003 | Pearson | A61B 18/1477 607/101 |
| 2009/0125017 A1 * | 5/2009 | Wang | A61B 18/1492 606/41 |
| 2010/0016848 A1 * | 1/2010 | Desai | A61B 18/1492 606/41 |

(Continued)

FOREIGN PATENT DOCUMENTS

| | | |
|---|---|---|
| EP | 3811882 A1 | 4/2021 |
| JP | 2013252202 A | 12/2013 |

(Continued)

*Primary Examiner* — Adam Z Minchella
(74) *Attorney, Agent, or Firm* — Bridgeway IP Law Group, PLLC; Jihun Kim

(57) ABSTRACT

A medical device includes a tube through which fluid flows; a handle part that is coupled to a proximal end portion of the tube; an electrode tip that is coupled to a distal end portion of the tube; and a fluid injection unit that injects fluid into the tube, in which the electrode tip is formed with one or more injection grooves that communicate with a hollow of the tube to inject the fluid.

9 Claims, 7 Drawing Sheets

(56) References Cited

U.S. PATENT DOCUMENTS

| | | | | |
|---|---|---|---|---|
| 2011/0130745 A1* | 6/2011 | Shevgoor | .......... | A61M 25/0009 |
| | | | | 604/523 |
| 2011/0257649 A1* | 10/2011 | Geistert | ............. | A61B 18/1492 |
| | | | | 606/41 |
| 2013/0110100 A1* | 5/2013 | Groves | ............... | A61M 25/007 |
| | | | | 606/21 |
| 2016/0158509 A1 | 6/2016 | Wedan et al. | | |

FOREIGN PATENT DOCUMENTS

| | | |
|---|---|---|
| JP | 2016-152938 A | 8/2016 |
| WO | 2008/082988 A1 | 7/2008 |
| WO | 2018/031281 A1 | 2/2018 |

\* cited by examiner

MEDICAL DEVICE FOR PUNCTURING

BACKGROUND

1. Technical Field

The present invention relates to a medical device, and more particularly, to a medical device capable of puncturing and fluid injection.

2. Description of the Related Art

Various types of puncturing devices are used to form puncturing parts or channels through tissue. The devices may use a variety of puncturing means, for example, mechanical, electrical or optical puncturing means. Typically, the devices are inserted into a patient's body through a tubular device such as a dilator or a sheath. In many applications, users may wish to insert or withdraw fluid through the device before, after, or during a puncturing operation.

However, when a hole is formed or opened at an electrode tip that comes into contact tissue for this purpose, a coring phenomenon may occur in which the tissue remains in the hole or the open portion when puncturing with radio frequency (RF). When the tissue remains in this way, the tissue moves along blood vessels and may cause serious side effects such as stroke.

RELATED ART DOCUMENT

Patent Document (Patent Document 1) Japanese Patent Laid-Open Publication No. 2016-152938 (Published on Aug. 25, 2016)
(Patent Document 0002) US Patent Laid-Open Publication No. 2016-0158509 (published on Jun. 9, 2016)

SUMMARY

The present invention provides a medical device capable of puncturing and fluid injection.

Objects of the present invention are not limited to the above-mentioned objects. That is, other objects that are not mentioned may be obviously understood by those skilled in the art to which the present invention pertains from the following description.

An embodiment of present invention provides a medical device, including: a tube through which fluid flows; a handle part that is coupled to a proximal end portion of the tube; an electrode tip that is coupled to a distal end portion of the tube; and a fluid injection unit that injects fluid into the tube, in which the electrode tip is formed with one or more injection grooves that communicate with a hollow of the tube to inject the fluid.

The one or more injection grooves may be inclined radially inward from a side of the electrode tip toward the hollow of the tube.

The one or more injection grooves may include a first injection groove and a second injection groove that are formed symmetrically at positions facing each other.

The medical device may further include: a guide part that is disposed inside the tube and guides the fluid to the first injection groove and the second injection groove.

The guide part may be integrally formed with the electrode tip.

The guide part may be provided between the first injection groove and the second injection groove, and include a first inclined part and a second inclined part that are inclined toward the first injection groove and the second injection groove, respectively.

The medical device may further include: a pressure control unit that controls a pressure of the fluid injected through the fluid injection unit.

At least a section of the tube may be tapered such that a thickness of the distal end portion is smaller than that of the proximal end portion.

The tube may include a first tube to which the handle part is coupled and a second tube to which the electrode tip is coupled, the first tube may be made of a material with rigidity, and the second tube may be made of a material with flexibility.

The medical device may further include: a wire that has one end connected to the electrode tip or the distal end portion of the tube and the other end extending to the handle part.

The medical device may further include: a wire manipulation unit that is slidably or rotatably installed on the handle part, in which the other end of the wire may be connected to the wire manipulation unit.

According to the present invention, it is possible to implement fluid injection together with a puncturing operation. In particular, since an injection groove through which a fluid is injected communicates with a hollow of a tube, and specifically, is formed inclined radially inward from a side of an electrode tip toward the hollow of the tube, no hole is formed or opened in an electrode part that comes into contact with the tissue, so a coring phenomenon does not occur in which the tissue remains when punctured with radio frequency (RF).

In addition, since the injection groove is formed at an end portion of the tube, not on the side, and the fluid inside the tube is guided toward the injection groove by a guide part, it is possible to reduce pressure required for the fluid injection.

In addition, it is possible to adjust a path through which the fluid is injected by adjusting the pressure of the fluid injected through a fluid injection unit.

It should be understood that the effects of the present invention are not limited to the above-described effects, and include all effects that can be inferred from the configuration of the invention described in the detailed description or claims of the present invention.

DETAILED DESCRIPTION OF THE EMBODIMENTS

Figure 1:
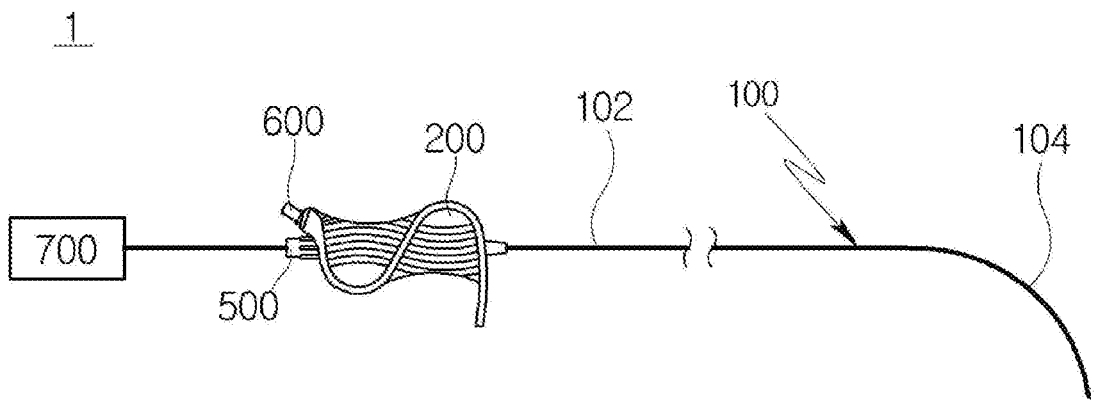
FIG. 1 is a front view illustrating a medical device according to a first embodiment of the present invention.

Hereinafter, a preferred embodiment of a medical device of the present invention will be described with reference to the accompanying drawings.

In addition, the terms to be described later are terms defined in consideration of functions in the present invention, which may vary according to the intention or custom of users or operators, and the following examples do not limit the scope of the present invention, but are only illustrative of the components set forth in the claims of the present invention.

For clear description, parts irrelevant to the description are omitted, and the same reference numerals are attached to the same or similar components throughout the specification. Throughout the present specification, unless explicitly described to the contrary, "comprising" any components will be understood to imply the inclusion of other elements rather than the exclusion of any other elements.

First, a medical device 1 according to a first embodiment of the present invention will be described with reference to FIGS. 1 to 4.

The medical device 1 according to the first embodiment of the present invention may largely include a tube 100, a handle part 200, an electrode tip 300, a guide part 400, a fluid injection unit 500, and an electric energy supply unit 600.

The tube 100 is a part for delivering fluid, and allows fluid to flow through a hollow and extends to have a proximal end portion 102 and a distal end portion 104. Here, the proximal end portion 102 refers to an end portion close to a user using the medical device, and the distal end portion 104 refers to an end portion far from the user. Here, the tube 100 may be formed of one tube, or a plurality of tubes may be connected to each other to form one tube. For example, the tube 100 includes two tubes, in which one tube may be partially inserted into the other tube to be connected to the other tube.

Figure 2:
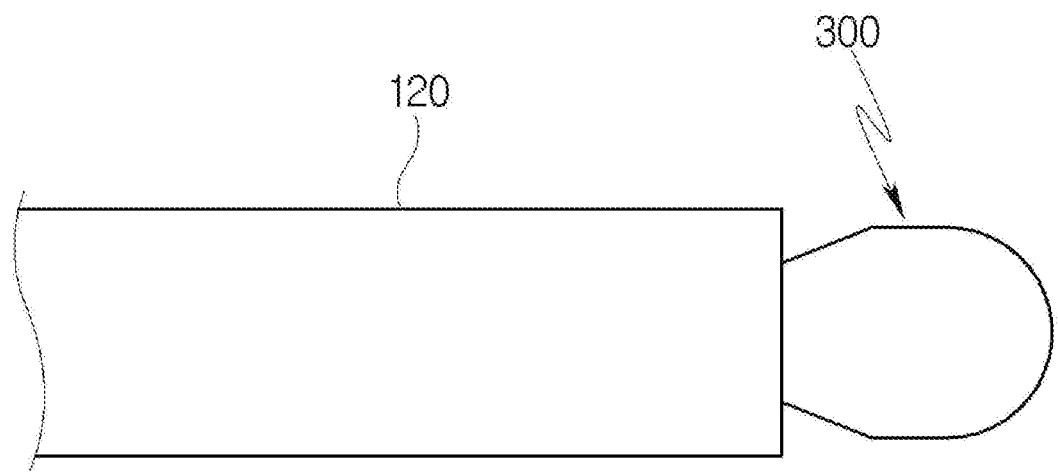
FIG. 2 is an enlarged front view of a part of a distal end portion of FIG. 1.
Figure 3:
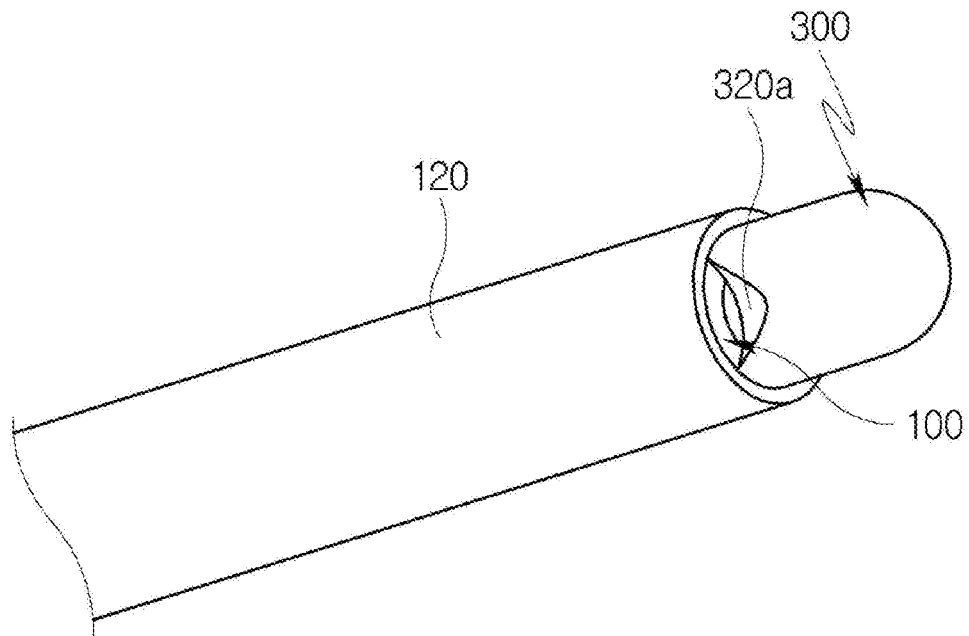
FIG. 3 is a perspective view of FIG. 2.
Figure 4:
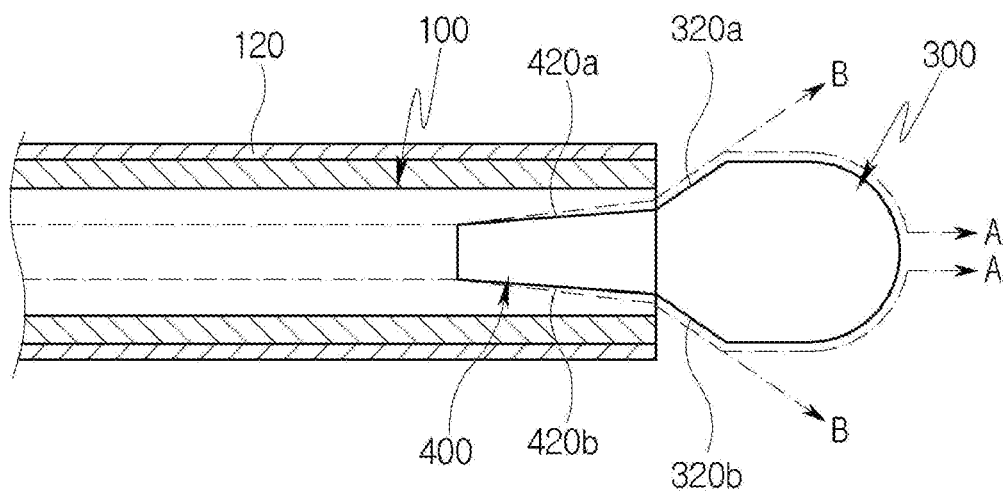
FIG. 4 is a cross-sectional view of FIG. 2.

The handle part 200 is coupled to the proximal end portion 102 of the tube, and the electrode tip 300 is coupled to the distal end portion 104 of the tube. The handle part 200 is located outside a body when using the medical device and corresponds to a part for the user to hold or manipulate. The electrode tip 300 is a part for cauterizing and puncturing body tissues by receiving electric energy, and at least a part thereof is coupled to protrude from the distal end portion 104 of the tube. As illustrated in FIGS. 2 to 4, in this embodiment, the electrode tip 300 is formed in a cylindrical shape with a round head and is coupled to the distal end portion 104 of the tube. Specifically, the electrode tip 300 is formed to have the same diameter as the distal end portion 104 of the tube, and surfaces facing each other may be coupled by welding.

The fluid injection unit 500 corresponds to a part for injecting fluid into the tube 100, and the tube 100 extends to the inside of the handle part 200, and the fluid injection unit 500 also extends to the inside of the handle part 200 and communicates with the tube 100. In this embodiment, the pressure control unit 700 for controlling the pressure of the fluid injected into the fluid injection unit 500 is connected, but is not limited thereto, and a user may inject fluid by connecting a syringe or the like to the fluid injection unit 500.

The electric energy supply unit 600 corresponds to a part for supplying electric energy to the electrode tip 300, and a radio frequency (RF) electric energy generated from a radio frequency (RF) generator may be supplied to the electrode tip 300 through the supply unit 600. The radio frequency generator generates radio frequency suitable for puncturing a body site of a patient, and may operate, for example, in a range of 200 kHz to 3.3 MHz. Specifically, the electric energy supply unit 600 may extend to the inside of the handle part 200 and be electrically connected to the tube 100. For example, the electric energy supply unit 600 may be a jack that may be electrically connected to a plug electrically connected to the radio frequency generator, and the jack and the tube 100 may be directly connected or may be connected with a separate conductive wire. Accordingly, the radio frequency electric energy may be transmitted from the supply unit 600 through the tube 100 to the electrode tip 300, and is applied to the body site of the patient through the electrode tip 300 to form puncturing through penetrating the body site. To this end, in this embodiment, the tube 100 has biocompatibility and may be made of an electrically conductive material like the electrode tip 300. Here, the biocompatibility refers to a material that is suitable for use in the body during surgical treatment. Materials of the tube 100 include, for example, stainless steel, copper, titanium, and nickel-titanium alloys (e.g., Nitinol). However, although not limited thereto, and when the tube is not made of an electrically conductive material (for example, when the tube is made of plastic), a separate wire may be further provided to transmit electric energy from the electric energy supply unit to the electrode tip.

In this embodiment, since the tube 100 is made of an electrically conductive material, an insulation tube 120 is provided to surround the tube 100 for insulation. However, although not limited thereto, and the tube 100 is coated with an insulator, but may be dip coated, spray coated, or heat shrink tubed. For example, examples of an insulator may include any one of polytetrafluoroethylene (PTFB), parylene, polyimides, polyethylene terepthalate (PET), polyether block amide, and polyether ether ketone, or a combination thereof.

Next, a structure in which the fluid injected into the tube 100 through the fluid injection unit 500 is injected to the outside of the tube 100 will be described with reference to FIGS. 2 to 4.

The electrode tip 300 is provided with one or more injection grooves 320 that communicates with the hollow of the tube 100 to inject fluid. In this embodiment, one or more injection grooves 320 include a first injection groove 320a and a second injection groove 320b that are formed symmetrically at positions facing each other. Specifically, the first injection groove 320a and the second injection groove 320b are each formed inclined radially inward from the side of the electrode tip 300 toward the hollow of the tube 100. In particular, an inclination of the first injection groove 320a and the second injection groove 320b are preferably formed to be recessed such that a sufficient bonding area between the tube 100 and the electrode tip 300 may be secured. Through this, the hollow of the tube 100 is partially opened such that the fluid inside the tube 100 may be injected to the outside.

In this case, as illustrated in FIG. 4, a guide part 400 for guiding the fluid to the first injection groove 320a and the second injection groove 320b may be disposed inside the tube 100. In this embodiment, the guide part 400 is integrally formed with the electrode tip 300, and is provided in a flat shape between the first injection groove 320a and the second injection groove 320b. The guide part 400 includes a first inclined part 420a that is inclined toward the first injection groove 320a to guide the fluid to the first injection groove 320a, and a second inclined part 420b that is inclined toward the second injection groove 320b to guide the fluid to the second injection groove 320b.

Accordingly, the fluid injected from the proximal end portion 102 of the tube and flowing to the distal end portion 104 of the tube may be injected through the injection groove 320, and may be naturally guided toward the injection groove 320 along the inclined part 420 of the guide part. In this way, the injection groove 320 is formed at the end portion of the tube 100, not on the side, and since the fluid is guided toward the injection groove 320 by the guide part 400 inside the tube 100, it is possible to reduce pressure required to inject fluid.

Furthermore, as the pressure of the fluid injected through the fluid injection unit 500 is adjusted by the pressure control unit 700, the fluid injection path may be adjusted. Specifically, when the pressure of the fluid injected through the fluid injection unit 500 is lower than a certain value, the fluid injected through the injection groove 320 will flow along the outer surface of the electrode tip 300 (path A in FIG. 4), and when the pressure of the fluid is higher than the certain value, the fluid injected through the injection groove 320 will be injected in a straight line and will be injected to a wider range (path B in FIG. 4).

According to the present invention, it is possible to implement fluid injection together with a puncturing operation. In particular, when the injection groove 320 through which the fluid is injected is in communication with the hollow of the tube 100, and specifically, formed to be inclined radially inward from the side of the electrode tip 300 toward the hollow of the tube 100, no hole is formed or opened in an electrode tip portion that comes into contact with the tissue, so a coring phenomenon does not occur in which the tissue remains when punctured with radio frequency (RF).

Figure 5:
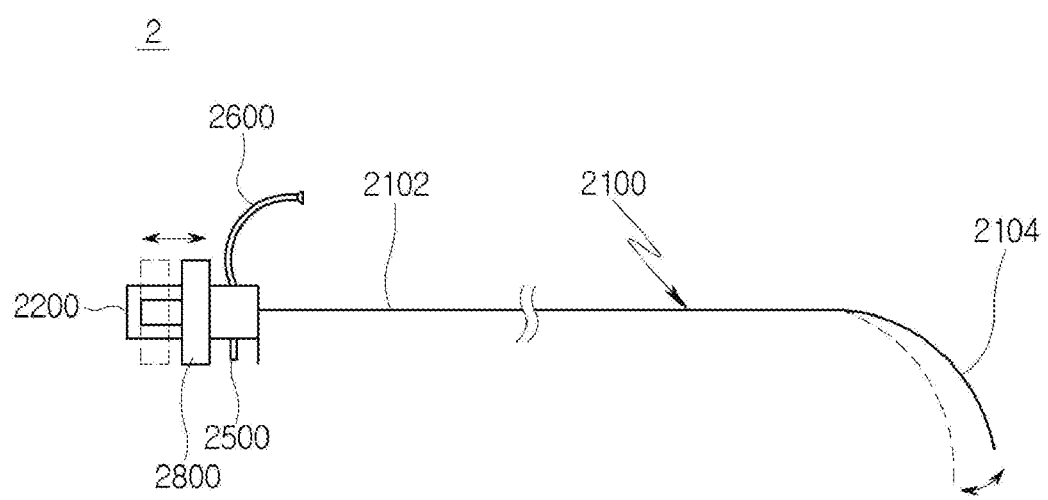
FIG. 5 is a front view illustrating a medical device according to a second embodiment of the present invention.
Figure 6:
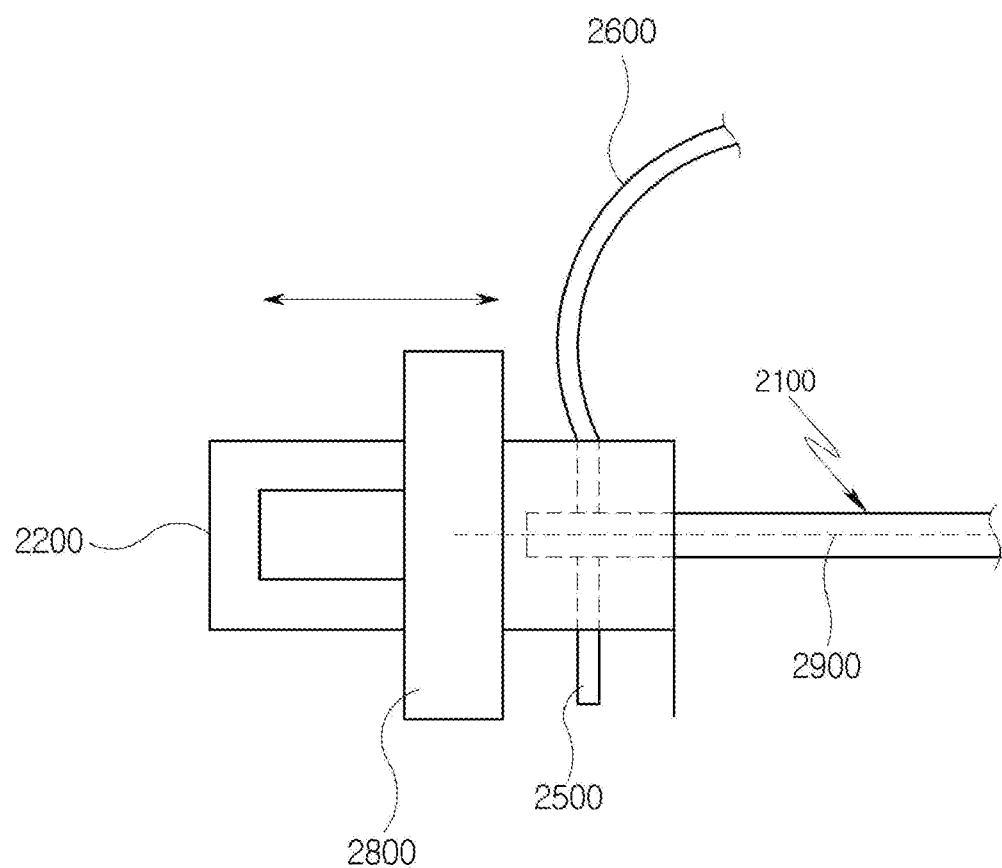
FIG. 6 is an enlarged front view of a part of a proximal end portion of FIG. 5.

Next, a medical device 2 according to a second embodiment of the present invention will be described with reference to FIGS. 5 to 7.

The medical device 2 according to the second embodiment of the present invention may largely include a tube 2100, a handle part 2200, an electrode tip 2300, a guide part 2400, a fluid injection unit 2500, an electric energy supply unit 2600, a wire manipulation unit 2800, and a wire 2900. Here, since the configurations of the tube 2100, the electrode tip 2300, the guide part 2400, the fluid injection unit 2500, and the electric energy supply unit 2600 are the same as described above, different parts will be mainly described.

In this embodiment, the wire manipulation unit 2800 is slidably installed on the handle part 2200. As described below, the wire manipulation unit 2800 corresponds to a part for manipulating the wire 2900, and may be connected to the proximal end portion of the wire 2900 to pull or push the wire 2900. Specifically, a hole of a certain length may be formed in the handle part 2200, and the wire manipulation unit 2800 may be slidably installed through the hole. However, although not limited thereto, and the wire manipulation unit may be rotatably installed on the handle part.

The medical device 2 further includes the wire 2900 that has one end connected to the electrode tip 2300 or the distal end portion 2104 of the tube and the other end extending to the handle part 2200 for a steering function. In this embodiment, the proximal end portion of the wire 2900 is connected to the wire manipulation unit 2800, and the distal end portion thereof is connected to the end of the guide part 2400 integrally formed with the electrode tip 2300. Accordingly, when a user pulls the wire manipulation unit 2800 toward the user, the wire 2900 connected to the end of the electrode tip 2300 is pulled together, and the distal end portion 2104 of the tube is further bent toward the user.

Figure 7:
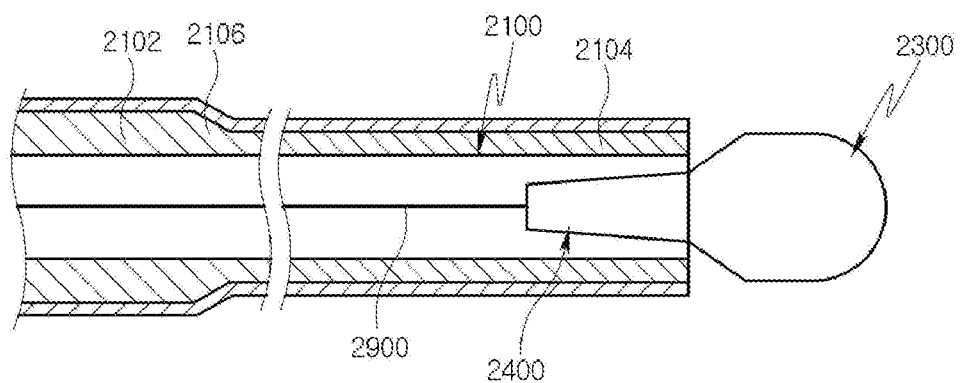
FIG. 7 is an enlarged cross-sectional view of a part of the distal end portion of FIG. 5.

To this end, as illustrated in FIG. 7, at least a section 2106 of the tube 2100 may be formed to be tapered such that a thickness of the distal end portion 2104 is thinner than that of the proximal end portion 2102. Although not limited thereto, in FIG. 7, the thickness of the proximal end portion 2102 of the tube is shown to correspond to approximately twice the thickness of the distal end portion 2104 of the tube. Accordingly, the flexibility of the distal end portion 2104 of the tube may increase while the proximal end portion 2102 of the tube maintains rigidity.

Figure 8:
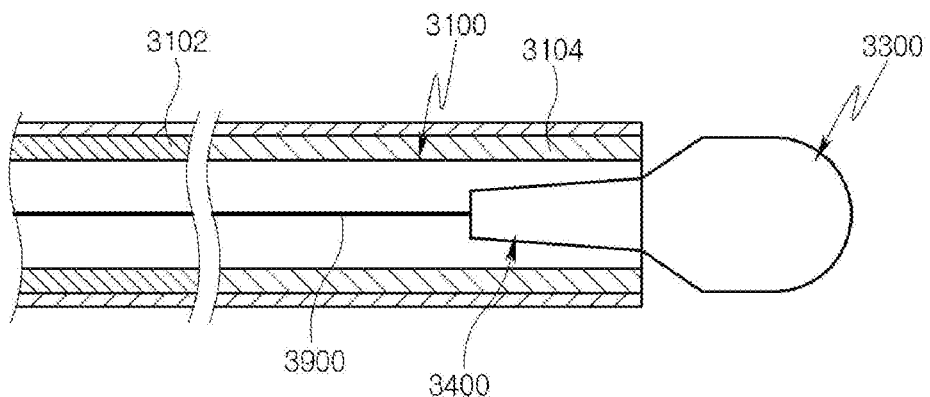
FIG. 8 is an enlarged cross-sectional view of a part of a distal end portion of a medical device according to a third embodiment of the present invention.

Next, a medical device according to a third embodiment of the present invention will be described with reference to FIG. 8. The medical device according to the third embodiment of the present invention differs from the medical device 2 according to the second embodiment described above only in the structure of the tube, and other components are all the same as those of the second embodiment. Accordingly, the tube will be mainly described.

In this embodiment, a tube 3100 includes a first tube 3102 to which the handle part is coupled and a second tube 3104 to which an electrode tip 3300 is coupled, and the first tube 3102 may be made of a material with rigidity and the second tube 3104 may be made of a material with flexibility. In this case, the first tube 3102 corresponds to the proximal end portion of the tube, and the second tube 3104 corresponds to the distal end portion of the tube. Accordingly, the distal end portion of the tube may provide flexibility so as to be bendable while the proximal end portion of the tube may maintain rigid to provide column strength. When a user pulls the wire manipulation unit toward the user, the wire 3900 connected to an end of a guide part 3400 integrally formed with the electrode tip 3300 may be pulled together, and the second tube 3104 may be bent toward the user. For example, the first tube 3102 may be made of stainless steel and the second tube 3104 may be made of a nickel titanium alloy such as Nitinol.

Hereinafter, a method of using the medical device 1 according to the first embodiment of the present invention will be described with reference to FIGS. 9 and 10. The body site for forming the puncturing may be tissue within a patient's heart, for example, an atrial septum 10 of the heart. This target site may be accessed via an inferior vena cava (IVC), for example via a femoral vein.

Figure 9:
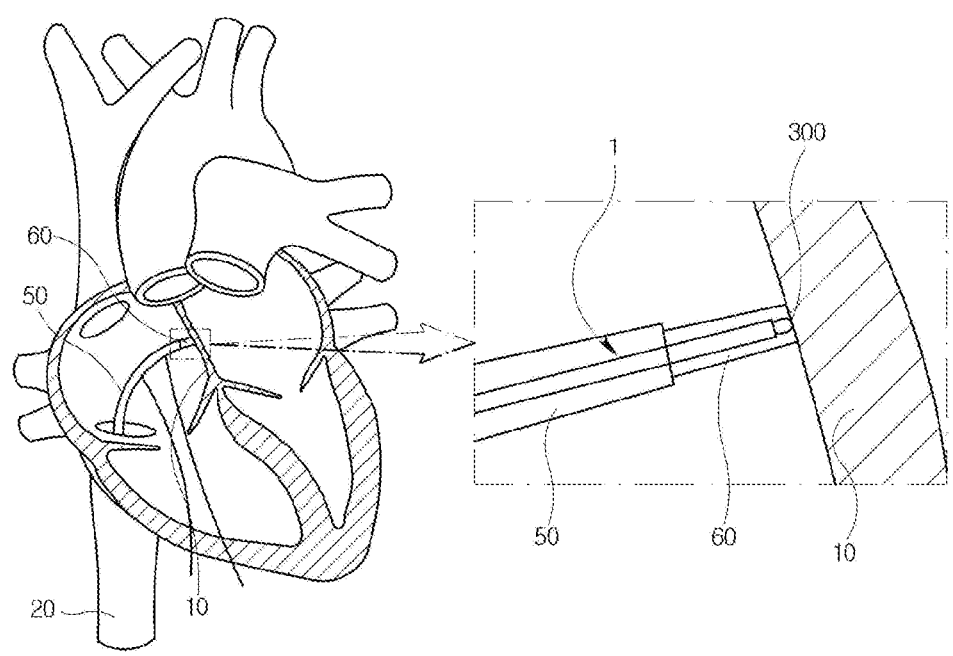
FIGS. 9 and 10 are schematic diagrams illustrating a method of using a medical device of the present invention.

First, referring to FIG. 9, the user may insert a sheath 50 and a dilator 60 into a right atrium of a heart through the inferior vena cava 20. Specifically, the user may introduce a guide wire into a femoral vein, generally a right femoral vein, insert the guide wire into the heart, and then insert the sheath 50 and the dilator 60 into the heart along the guide wire. Thereafter, the guide wire is removed, the medical device 1 of the present invention is inserted into the sheath 50 and the dilator 60, and the user may position the distal end portion of the dilator 60 in contact with the atrial septum 10, which is a target site. In this case, the electrode tip 300 of the medical device 1 may be aligned with the distal end portion of the dilator 60. To facilitate the alignment, the electrode tip 300 may be made of platinum (Pt) or iridium (Jr). This is because platinum and iridium correspond to materials impervious to X-rays, and thus, a user may easily check the position of the electrode tip 300 under X-ray fluoroscopy.

When the distal end portion of the dilator 60 is arranged with respect to a fossa ovalis of the atrial septum 10, the electrode tip 300 contacts the atrial septum 10 and supplies electric energy to the electrode tip 300. That is, the radio frequency electric energy generated by the radio frequency generator is transmitted from the supply unit 600 to the electrode tip 300 via the tube 100. Accordingly, energy may be transmitted to the atrial septum 10 by the electrode tip 300 to be cauterized, and the puncturing is formed in the atrial septum 10.

Figure 10:
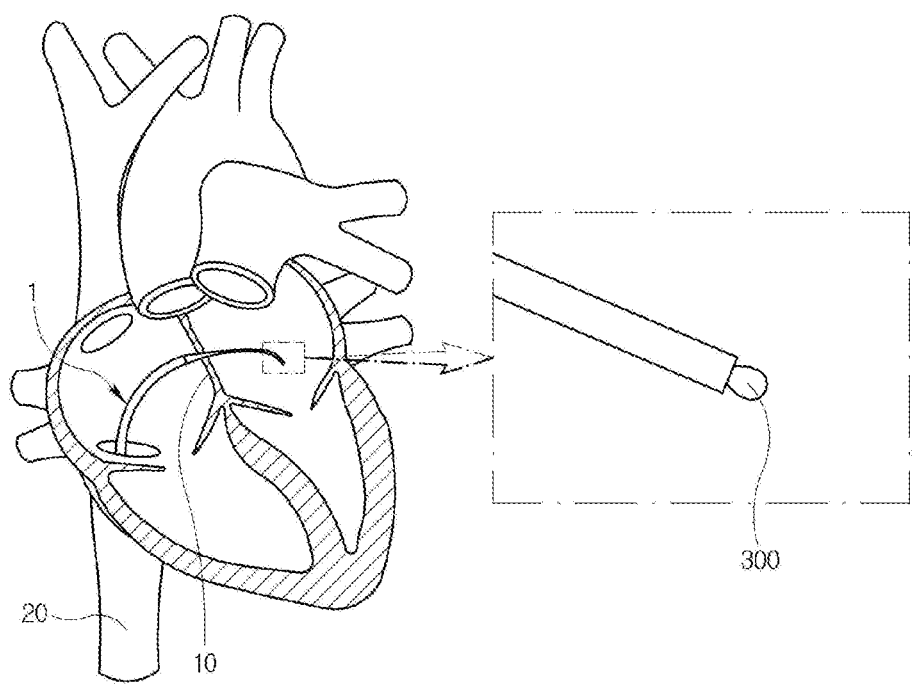

As illustrated in FIG. 10, when the puncturing is formed, the distal end portion of the tube 100 of the medical device 1 may pass through the puncturing and reach the left atrium. After that, the energy transmission may be stopped, and the fluid may be injected into the tube 100 through the fluid injection unit 500. The fluid may be, for example, a contrast agent, and the contrast agent injected into the tube 100 may be delivered to the distal end portion 104 of the tube and injected into the left atrium through the injection groove 320 of the electrode tip 300.

That is, the present invention is not limited to the specific embodiment described above, but may be variously modified by those skilled in the art to which the present invention pertains without departing from the gist of the present invention claimed in the claims, and these modifications are to fall within the scope of the present invention.

DESCRIPTION OF REFERENCE SIGNS 1, 2: Medical device
100, 2100, 3100: Tube
102, 2102: Proximal end portion
104, 2104: Distal end portion
120: Insulation tube
200, 2200: Handle part
300, 2300, 3300: Electrode tip
320, 320a, 320b: Injection groove
400, 2400, 3400: Guide part
420, 420a, 420b: Inclined part
500, 2500: Fluid injection unit
600, 2600: Electric energy supply unit
700: Pressure control unit
2800: Wire manipulation unit
2900, 3900: Wire
3102: First tube
3104: Second tube

What is claimed is:
1. A medical device, comprising:
a tube configured to allow fluid to flow therein;
a handle part coupled to a proximal end portion of the tube;
an electrode tip coupled to a distal end portion of the tube, wherein the electrode tip includes one or more injection grooves formed thereon that communicate with a hollow of the tube to inject the fluid;
a fluid injection unit extended into inside of the handle part to inject the fluid into the tube; and
a guide part extending from the electrode tip and disposed inside the tube to guide the fluid to the one or more injection grooves,
wherein the one or more injection grooves include a first injection groove and a second injection groove that are inclined and defined at positions facing each other,
wherein the guide part has a first inclined part on one side thereof, a second inclined part on an opposite side thereof and an end surface disposed opposite to the electrode tip, a first exterior surface of the first inclined part is connected to a second exterior surface of the second inclined part via the end surface without a through hole therebetween, and the first exterior surface is continuously connected to the first injection groove and the second exterior surface is continuously connected to the second injection groove, such that the fluid injected into the tube flows continuously along the first exterior surface and the first injection groove, and along the second exterior surface and the second injection groove, and
wherein an angle of inclination of the first inclined part is smaller than an angle of inclination of the first injection groove with respect to a longitudinal axis of the tube, and an angle of inclination of the second inclined part is smaller than an angle of inclination of the second injection groove with respect to the longitudinal axis of the tube.

2. The medical device of claim 1, wherein the one or more injection grooves are inclined radially inward from a side of the electrode tip toward the hollow of the tube.

3. The medical device of claim 1, wherein the guide part is integrally formed with the electrode tip.

4. The medical device of claim 1, wherein the guide part is disposed between the first injection groove and the second injection groove, and includes the first inclined part and the second inclined part that are inclined toward the first injection groove and the second injection groove, respectively.

5. The medical device of claim 1, further comprising:
a pressure control unit connected to the fluid injection unit to control a pressure of the fluid injected through the fluid injection unit.

6. The medical device of claim 1, wherein at least a section of the tube is tapered such that a thickness of the distal end portion is smaller than that of the proximal end portion.

7. The medical device of claim 1, wherein the tube includes a first tube to which the handle part is coupled and a second tube to which the electrode tip is coupled, the first tube is made of a material with rigidity, and the second tube is made of a material with flexibility.

8. The medical device of claim 1, further comprising:
a wire that has a first end connected to the electrode tip or the distal end portion of the tube and a second end extending to the handle part.

9. The medical device of claim 8, further comprising:
a wire manipulation unit slidably or rotatably disposed on the handle part and connected to the second end of the wire to pull or push the wire.

* * * * *